This invention relates to checking the capacity of condensers whether same are in circuit and shunted by any other impedance such as a resistor, or not.

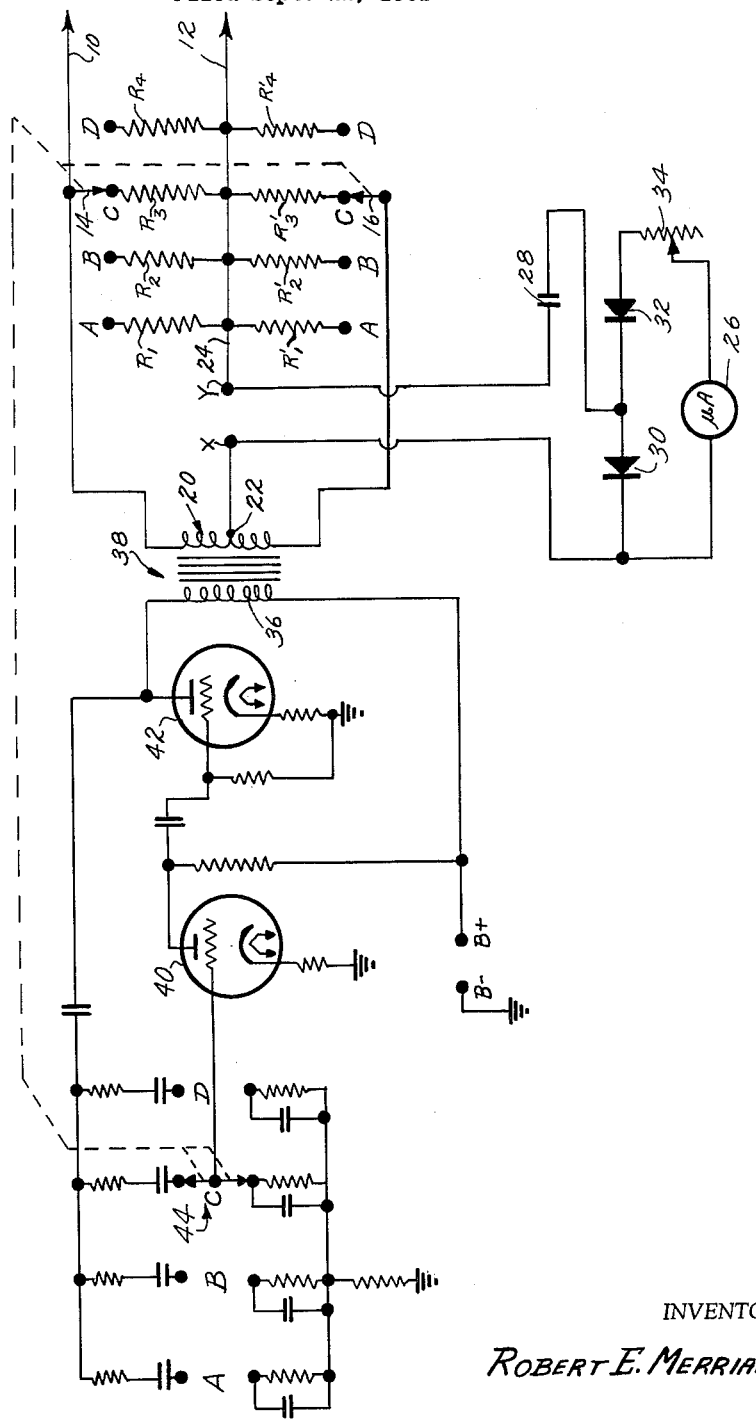
INVENTOR
ROBERT E. MERRIAM
BY Cushman, Darby & Cushman
ATTORNEYS 3,218,550
DIRECT READING IN CIRCUIT CAPACITY MEASURING DEVICE HAVING A VARIABLE FREQUENCY OSCILLATOR, THE FREQUENCY SELECTING MEANS OF WHICH ARE GAUGED TO A SET OF RANGE SELECTING IMPEDANCES
Robert E. Merriam, 833 Leonard Ave., Zanesville, Ohio
Filed Sept. 22, 1961, Ser. No. 139,956
7 Claims. (Cl. 324—60)

There are many instances in the pursuance of electrical repair work and the like where it is desirable to test a condenser to determine if it is open or short circuited and whether it has approximately the capacitance that it should have. With many prior art devices, it has been necessary to remove such a condenser from its circuit completely, or at least disconnect one terminal thereof, in order to check the condenser. It is an object of the present invention to provide apparatus by which it becomes unnecessary to remove a condenser at all from any circuit in which it may be operatively connected, especially when any shunting resistance may be relatively high. With this apparatus, the shunting resistance may be quite low, according to the capacity being measured, frequency and voltage applied, etc., without affecting the accuracy of the meter reading. Even when the resistance is low enough to begin changing the meter reading, the resistance can still then be almost halved before the accuracy of the meter reading is affected by 10%, providing for an exceptionally large tolerance in the way of checking condensers while they remain in their original circuit even if they are shunted by relatively low resistance paths.

In the construction of apparatus in accordance with this invention, there is provided a four legged bridge, two adjacent legs of which respectively include the halves of a center tapped transformer secondary winding. The other two legs selectively connect to any one of a plurality of sets of two impedances, for example resistors, which are of equal value, different impedance sets being of different values. Between the center tap and junction of the impedance legs is a microammeter coupled thereto by voltage doubling means. The transformer primary winding is coupled to the output of an oscillator, and the particular set of impedances selected for the range of capacitance to be measured determines, for example by ganging, the frequency supplied by the oscillator.

Other objects and advantages of this invention will become apparent to those skilled in the art by reference to the attached drawing and detailed description thereof which follows.

Probes 10 and 12 are those which may be applied across a condenser alone or as shunted by impedance. These two probes are coupled across the one of the upper resistors $R_1$, $R_2$, $R_3$, $R_4$ which is selected by switch 14. As indicated, this switch is ganged with switch 16, and accordingly to lower resistors $R_1'$, $R_2'$, $R_3'$, $R_4'$ become respectively paired with the corresponding upper resistors between switches 14 and 16 as impedance sets. Switch 14 connects to the upper end of the center tapped secondary winding 20 while switch 16 connects to the lower end thereof. Between center tap 22 and the junctions 24 of the respective sets of resistors is a microammeter 26. This meter is connected thereto by a coupling condenser 28 and a voltage doubler circuit including silicon rectifiers 30 and 32 the latter of which is in series with rheostat 34.

As is apparent from the drawing, the upper half of secondary winding 20 forms one leg of a bridge, while the lower half forms an adjacent bridge leg. The other two legs of the bridge respectively include the two resistors of the set which is selected by switches 14 and 16, for example resistors $R_3$ and $R_3'$.

To supply excitation to the bridge circuit, the primary winding 36 of transformer 38 is coupled to the output of an oscillator. As illustrated, this oscillator may be of the two tube resistance coupled amplifier type. Tubes 40 and 42 may be respective sections of a 6DE7 dual triode tube. Positive feed-back from the output of tube 42 is fed to the grid circuit of tube 40 through a selected one of four frequency determining circuits each of which consists of a series RC circuit and a parallel RC circuit. There is a different frequency selecting position for switch 44 for each different impedance set in the bridge, and the setting of switch 44 is correlated with the setting of switches 14 and 16, as is indicated by the dash line ganging. For example, when switches 14 and 16 are set to position A, switch 44 is also set to its A position. Any set of the bridge resistors selected by switches 14 and 16 has its resistors of equal value, but different resistor sets have different values. For example, resistors $R_1$ and $R_1'$ may be of 68 ohms, resistors $R_2$ and $R_2'$ of 82 ohms, resistors $R_3$ and $R_3'$ of 200 ohms, and resistors $R_4$ and $R_4'$ of 15,000 ohms, as exemplary values. These values are selected to give the meter sufficient sensitivity to shorts in any condenser connected across probes 10 and 12 but are not so high that very low external resistance shunting a condenser will affect the accuracy of the meter.

In operation, switches 14 and 16 are set to select the resistor sets associated with the range of capacitance to be measured, and this automatically, by virtue of positioning switch 44, also, sets the frequency of the oscillator appropriately. Exemplary frequencies which may be employed with the above resistance values are 60 c.p.s. in conjunction with selection of $R_1$ and $R_1'$, 12,000 c.p.s. for either of the next two sets of resistors, and 20,000 c.p.s. for the $R_4$ and $R_4'$ resistor set. With such a selection, exemplary ranges of capacity that may then be measured are, respectively for switch positions A–D, 2 to 2,000 mfd., .01 to 1.0 mfd., .0005 to .03 mfd. and .00005 to .006 mfd. These are measurable capacity ranges. Each range of course actually extends down to 0 mfd., but the meter pointer movement is so slight until a certain capacity is reached that the useable portion of the meter scale represents ranges such as given.

After initially selecting the approximate settings for the different switches, probes 10 and 12 may be touched together for a full scale setting of meter 20 by adjustment of rheostat 34 which may provide a maximum of 50,000 ohms for example. Then, when the probes are placed across a condenser, the amount of capacitance thereof may be directly indicated on the meter. Of course, if the condenser is itself shorted, the meter will read full scale, while if the condenser is open circuited the meter will read zero.

As exemplary of minimum shunt resistances, which will not, or perhaps just barely, affect meter readings, at specific meter deflection points in the different ranges above indicated using the bridge leg resistors and frequencies mentioned, the following chart is set forth.

| Switch position | Meter deflection | Measured capacitance (mfd.) | Minimum shunt R (ohms) | Voltage across X-Y (volts) |
|---|---|---|---|---|
| A | ¼ | 8 | 1,000 | 0.6 |
|   | ½ | 16 | 700 | 0.8 |
|   | ¾ | 80 | 100 | 1.4 |
|   | Full | (¹) | 0 | 1.5 |
| B | ¼ | .01 | 700 | 0.6 |
|   | ½ | .068 | 150 | 3.0 |
|   | ¾ | .25 | 100 | 4.2 |
|   | Full | (¹) | 0 | 2.0 |
| C | ¼ | .002 | 5,000 | 3.0 |
|   | ½ | .005 | 3,000 | 3.2 |
|   | ¾ | .02 | 3,000 | 6.0 |
|   | Full | (¹) | 0 | 2.5 |
| D | ¼ | .0005 | 15,000 | 1.3 |
|   | ½ | .002 | 2,000 | 2.5 |
|   | ¾ | .005 | 800 | 3.6 |
|   | Full | (¹) | 0 | 3.2 |

¹ Probes shorted.

From the above chart, it may be noted that the voltage across points X and Y, i.e., the A.C. voltage fed to rectifiers 30 and 32 is quite low and varies considerably for different switch positions. This is due to a variety of factors including employment of different frequencies and also variance in oscillator output voltage for different switch positions. Regulation of the oscillator output voltage may be used if desired, but such is unnecessary for purposes of this invention. Also, rectifiers 30, 32 need not be of quality sufficient to respond linearly over the range of frequencies employed.

As previously mentioned, the external shunt resistance which just begins to move the meter pointer may be halved without making the meter reading 10% inaccurate. In fact, in measuring a .01 mfd. condenser in the B switch position, the external shunt resistance can be lowered from the 700 ohm value in the chart to 220 ohms without causing even a 10% inaccuracy in the meter reading, providing for a very practical arrangement since capacitor tolerances are themselves many times greater than 10%.

It is preferable, as is indicated by the voltages across points X and Y, that the transformer secondary 20 provide low voltages so that the voltage across probes 10 and 12 will be low and safe not only for the user but in checking condensers in any transistor circuit where too much voltage might damage the transistor or other components in the circuit. Approximately 6 volts across the secondary winding is suitable, and in this connection transformer 38 may step down the oscillator voltage 20:1.

For checking capacities in the ranges related to the C and D switch positions, radio frequency instead of audio frequency voltages, and RF chokes instead of bridge resistors, may be employed with the result that minimum condenser shunting resistance is considerably lowered. Good results have been obtained using a frequency of 5 mc. and 10 mh. inductances in place of resistors $R_3$ and $R_3'$.

The illustrated oscillator provides oscillations approximating a sine wave, but square wave power for the bridge has also given good results.

Since the test equipment described is capable of checking condensers in circuit, much time and effort can be saved by its employment.

Thus it is apparent that the various objects and advantages herein set forth are successfully achieved. Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for checking the capacitance of condensers in or out of circuit comprising a bridge having four legs, two adjacent ones of which include the respective halves of a center tapped transformer secondary winding, the remaining legs selectively including any one of a plurality of sets of two equal valued impedances respectively in said remaining legs, the impedances in different ones of said sets being of different value, a microammeter, voltage doubling-rectifying means coupling said microammeter between said center tap and the junction of the said remaining legs, means for selecting a different said set of impedances for different ranges of capacitances to be checked, a transformer including said secondary winding and having a primary winding, means operatively connected to said primary winding for exciting said bridge at any one of a plurality of predetermined frequencies including means for setting the operating frequency, said frequency and impedance set selecting means being ganged together, and probe means extending from opposite ends of one of the impedances in a selected set for disposition across a condenser the capacitance of which is to be checked by a reading of said microammeter.

2. Apparatus as in claim 1 wherein at least some of said impedance sets are sets of resistors.

3. Apparatus as in claim 2 wherein said bridge exciting means is a variable frequency oscillator.

4. Apparatus as in claim 3 wherein said transformer substantially steps down the oscillator output voltage.

5. Apparatus capable of checking the capacitance of condensers fully connected in their respective operating circuits and shunted by resistance, comprising:
   a bridge having first and second branches each with two legs,
   said first branch having two substantially equal valued impedances,
   said second branch selectively including any one of a plurality of sets of two equal valued resistors connected in series and respectively in the said second branch legs,
   means for selecting a different said set of resistors for different capacitance ranges of condensers to be checked,
   the resistors in different ones of said sets being of a different value for said different ranges,
   means for driving said bridge at a desired frequency, said bridge driving means including means for selecting different predetermined frequencies for different ones of said ranges, said frequency and resistor set selecting means being ganged together,
   means including a meter coupled between the junctions of the two legs in each said branch, and
   probe means extending from opposite ends of one of the said resistors in a selected set thereof for disposition across a condenser the capacitance of which is to be checked by a reading of said meter,
   the value of the said one resistor in the selected set thereof being such that the value of the parallel impedance for that one resistor, the condenser being checked, and its said shunting resistance is affected mainly only by the reactance of that condenser and insignificantly by the value of its said shunting resistance, whereby a reading by said meter can accurately reflect the capacitance of a shunted condenser being checked in circuit.

6. Apparatus capable of checking the capacitance of condensers fully connected in their respective operating circuits and shunted by resistance having a value of no less than in the order of 100 ohms, comprising:
   a bridge having four legs two adjacent ones of which include the respective halves of a center tapped transformer secondary winding,
   the remaining legs selectively including any one of a plurality of sets of two equal valued resistors connected in series and respectively in said remaining legs,
   means for selecting a different said set of resistors for different capacitance ranges of condensers to be checked, the resistors in different ones of said sets being of a different value for said different ranges, means, including a transformer having said secondary winding, for driving said bridge at a desired frequency, said bridge driving means including means for selecting different predetermined frequencies for different ones of said ranges, said frequency and resistor set selecting means being ganged together, means including a meter coupled between said center tap and the junction of the selected set of resistors, and probe means extending from opposite ends of one of the said resistors in a selected set thereof for disposition across a condenser the capacitance of which is to be checked by a reading of said meter, the value of the said one resistor in the selected set thereof being such that the value of the parallel impedance for that one resistor, the condenser being checked, and its said shunting resistance is affected mainly only by the reactance of that condenser and insignificantly by the value of its said shunting resistance, whereby a reading by said meter can accurately reflect the capacitance of a shunted condenser being checked in circuit.

7. Apparatus as in claim 6 wherein said driving means causes a voltage across said secondary winding of up to approximately six volts whereby the voltage between said probe means is low, making it safe for an operator to handle said probe means.

References Cited by the Examiner

UNITED STATES PATENTS

| | | | |
|---|---|---|---|
| 2,121,725 | 6/1938 | Baumzweiger | 324—60 |
| 2,309,934 | 2/1943 | Clay | 324—60 |
| 2,346,396 | 4/1944 | Rider | 331—179 X |
| 2,584,800 | 2/1952 | Grisdale | 324—119 X |
| 2,595,626 | 5/1952 | Bailey | 324—57 |

WALTER L. CARLSON, *Primary Examiner.*